US012022602B2

(12) United States Patent
Hunt

(10) Patent No.: US 12,022,602 B2
(45) Date of Patent: Jun. 25, 2024

(54) DEFENSE MECHANISM AGAINST DIRECTED-ENERGY SYSTEMS BASED ON LASER INDUCED ATMOSPHERIC OPTICAL BREAKDOWN

(71) Applicant: THE BOEING COMPANY, Chicago, IL (US)

(72) Inventor: Jeffrey H. Hunt, Thousand Oaks, CA (US)

(73) Assignee: THE BOEING COMPANY, Arlington, VA (US)

( * ) Notice: Subject to any disclaimer, the term of this patent is extended or adjusted under 35 U.S.C. 154(b) by 214 days.

(21) Appl. No.: 17/220,742

(22) Filed: Apr. 1, 2021

(65) Prior Publication Data

US 2021/0227677 A1 Jul. 22, 2021

Related U.S. Application Data

(62) Division of application No. 14/932,720, filed on Nov. 4, 2015, now abandoned.

(51) Int. Cl.
*H05H 1/46* (2006.01)
*F41H 13/00* (2006.01)

(52) U.S. Cl.
CPC ............. *H05H 1/46* (2013.01); *F41H 13/005* (2013.01)

(58) Field of Classification Search
CPC ..... H05H 1/46; F41H 13/0043; F41H 13/005; F41H 13/0056; F41H 13/0062; F41H 13/0068; F41H 13/0075; F41H 13/0087; F41H 13/0093
See application file for complete search history.

(56) References Cited

U.S. PATENT DOCUMENTS

| | | | | | |
|---|---|---|---|---|---|
| 5,175,664 | A * | 12/1992 | Diels | H01T 2/00 | 361/213 |
| 5,400,688 | A | 3/1995 | Eninger et al. | | |
| 5,726,855 | A * | 3/1998 | Mourou | H02G 13/00 | 361/213 |
| 5,747,720 | A * | 5/1998 | Schnurr | G01S 17/86 | 250/347 |
| 7,255,062 | B1 | 8/2007 | Higman | | |
| 8,218,589 | B1 * | 7/2012 | Saunders | G01S 17/66 | 372/33 |
| 8,981,261 | B1 * | 3/2015 | Tillotson | F41H 13/0093 | 219/202 |
| 2002/0035918 | A1 | 3/2002 | Jung | | |
| 2004/0118270 | A1 * | 6/2004 | Barrett | F42B 10/66 | 89/1.11 |
| 2007/0144392 | A1 * | 6/2007 | Wood | H05H 1/52 | 376/121 |
| 2007/0180983 | A1 | 8/2007 | Farinella et al. | | |
| 2008/0275572 | A1 | 11/2008 | Tillotson | | |

(Continued)

*Primary Examiner* — Sean M Luck
(74) *Attorney, Agent, or Firm* — Patterson + Sheridan, LLP

(57) ABSTRACT

A laser defense system may be used to generate a plasma shield for protecting a structure against a directed-energy source. The laser defense system may include a short pulsed laser which generates plasma in a plasma shield region between the structure and the directed-energy source. Because plasma is opaque to electromagnetic radiation, the laser signal emitted by the directed-energy source is absorbed by the plasma shield rather than striking the structure.

20 Claims, 4 Drawing Sheets

(56) References Cited

U.S. PATENT DOCUMENTS

| | | | | |
|---|---|---|---|---|
| 2009/0084252 | A1* | 4/2009 | Marquis | G01S 7/495 89/1.11 |
| 2009/0097508 | A1* | 4/2009 | Protz | H01S 3/1307 372/6 |
| 2010/0319526 | A1 | 12/2010 | Imholt et al. | |
| 2013/0033695 | A1* | 2/2013 | Kong | F41H 13/0062 356/28 |
| 2013/0099096 | A1* | 4/2013 | Hutchin | G01S 3/784 250/208.1 |
| 2013/0125656 | A1* | 5/2013 | Tillotson | F42D 5/045 73/599 |
| 2013/0263726 | A1* | 10/2013 | Tillotson | F42D 5/045 89/36.02 |
| 2014/0176954 | A1 | 6/2014 | Scott et al. | |
| 2018/0092195 | A1* | 3/2018 | Nishikata | H05H 1/24 |

* cited by examiner

DEFENSE MECHANISM AGAINST DIRECTED-ENERGY SYSTEMS BASED ON LASER INDUCED ATMOSPHERIC OPTICAL BREAKDOWN

FIELD

The present disclosure relates to laser defense systems, and more specifically, to generating a plasma field to counter a directed-energy source.

BACKGROUND

Directed-energy sources emits highly focused energy such as electromagnetic radiation (e.g., radio frequency (RF), microwave, lasers, and the like) to damage a target. In one example, directed-energy sources (also referred to as "directed-energy systems" or "directed-energy weapons") use lasers to track the target for a period of time in order to damage the target. As the effectiveness of directed-energy systems improve, countering the threat posed by these systems becomes more important.

SUMMARY

One aspect described herein is a defense system that includes a pulsed laser source, an optical control system configured to direct laser signals emitted by the pulsed laser source to generate a plasma shield in a defined plasma shield region located between a target structure and a directed-energy source in order to protect the target structure from energy emitted by the direct-energy source.

In one aspect, in combination above, during each pulse of the pulsed laser source, the optical system deflects a respective one of the laser signals to a defined sub-portion of the plasma shield region, where the plasma shield region is divided into a plurality of sub-portions.

In one aspect, in combination with any example above, the optical control system is configured to, using a plurality of pulses of the pulsed laser source, generate the plasma shield region by rastering the pulsed laser source in a predefined pattern through the plurality of sub-portions.

In one aspect, in combination with any example above, the optical control system further comprises a beam steering mechanism configured to deflect the laser signals to raster the pulsed laser source in the predefined pattern.

In one aspect, in combination with any example above, the optical control system is configured to generate the plasma in multiple sub-portions of the plurality of sub-portions simultaneously by splitting a laser signal emitted during a single pulse of the pulsed laser source into separate laser signals that each focus onto a respective one of the multiple sub-portions.

In one aspect, in combination with any example above, the optical control system comprises a lenslet configured to split the laser signal emitted during the signal pulse into the separate laser signals.

In one aspect, in combination with any example above, a lens to focus the laser signals to establish the plasma shield region at a predefined distance from the target structure.

Moreover, aspects herein include any alternatives, variations, and modifications of the preceding arrangement or configurations of the defense systems recited above.

Another aspect described herein is a laser defense system that includes at least one sensor configured to detect electromagnetic radiation emitted by a directed-energy source, a laser source, and an optical control system. The optical control system is configured to, in response to detecting the electromagnetic radiation, direct a laser signal emitted by the laser source to generate a plasma in a defined plasma shield region.

In one aspect, in combination with the laser defense system above, a plurality of sensors that includes the at least one sensor, where the plurality of sensors are disposed at different locations on a structure targeted by the directed-energy source.

In one aspect, in combination with any of the laser defense system examples above, the laser source does not emit the laser signal until the electromagnetic radiation is detected using the at least one sensor.

In one aspect, in combination with any of the laser defense system examples above, the laser source emits the laser signal before the electromagnetic radiation is detected using the at least one sensor.

In one aspect, in combination with any of the laser defense system examples above, the optical control system is configured to establish the plasma shield region based on a location of the directed-energy source such that the plasma shield region is between the directed-energy source and a structure targeted by the directed-energy source.

In one aspect, in combination with any of the laser defense system examples above, the laser source is a pulsed laser source and the plasma shield region is divided into a plurality of sub-portions, wherein the optical control system is configured to generate plasma in only one of the sub-portions during each pulse of the laser source.

In one aspect, in combination with any of the laser defense system examples above, the laser source is a pulsed laser source and the plasma shield region is divided into a plurality of sub-portions, wherein the optical control system is configured to generate plasma in multiple sub-portions of the plurality of sub-portions during each pulse of the laser source.

Moreover, aspects herein include any alternatives, variations, and modifications of the preceding arrangement or configurations of the laser defense systems recited above.

Another aspect described herein is a method that includes detecting electromagnetic radiation emitted by a directed-energy source that strikes a structure and generating, in response to detecting the electromagnetic radiation, plasma in a plasma shield region disposed between the directed-energy source and the structure.

In one aspect, in combination with the method above, generating the plasma in the plasma shield region includes rastering a laser source generating the plasma in a predefined pattern to generate the plasma shield region, wherein the predefined pattern divides the plasma shield region into a plurality of sub-portions.

In one aspect, in combination with any of the method examples above, generating the plasma in the plasma shield region includes repeating the predefined pattern using the pulsed laser source before the plasma in any one of the sub-portions completely disappears.

In one aspect, in combination with any of the method examples above, wherein generating the plasma in the plasma shield region includes splitting a laser signal into a plurality of separate laser signals and focusing each of the separate laser signals onto respective sub-portions of the plasma shield region, wherein the separate laser signals generate plasma in the sub-portions simultaneously.

In one aspect, in combination with any of the method examples above, splitting the laser signal is performed using a lenslet disposed between a laser source emitting the laser signal and the plasma shield region.

Moreover, aspects herein include any alternatives, variations, and modifications of the preceding arrangement or configurations of the methods recited above.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Directed-energy systems typically use electromagnetic radiation (e.g., radio frequency, microwaves, lasers, etc.) rather than projectiles to harm a target. However, depending on the material of the target, the directed-energy system may need to keep a laser at the same location on the target for a sufficient length of time in order to penetrate the outer surface of the target. The examples herein disclose a laser defense system that prevents a directed-energy source (e.g., a laser source) from damaging a target. To do so, the laser defense system generates a plasma shield in a region of space between the target and the directed-energy source. Plasma is opaque to electromagnetic energy meaning that lasers, microwave energy, RF signals and the like are unable to pass through the plasma, and instead, are absorbed by the plasma. As such, the energy emitted by the directed-energy source is absorbed by the plasma shield and does not harm the target.

In one aspect, the laser defense system constantly maintains the plasma shield around a vulnerable location or component in the vehicle. Thus, if this location is ever targeted by a directed-energy source, the plasma shield is already in place between the target and the directed-energy source to prevent the emitted energy from harming the vulnerable location. Alternatively, the laser defense system may include a number of sensors for detecting energy emitted by a directed-energy source. Because it may take a second or more for the energy to harm the target, this provides enough time for the laser defense system to identify a location of the directed-energy source and generate a plasma shield that blocks the emitted energy from striking the target before the energy can harm the target.

Figure 1:
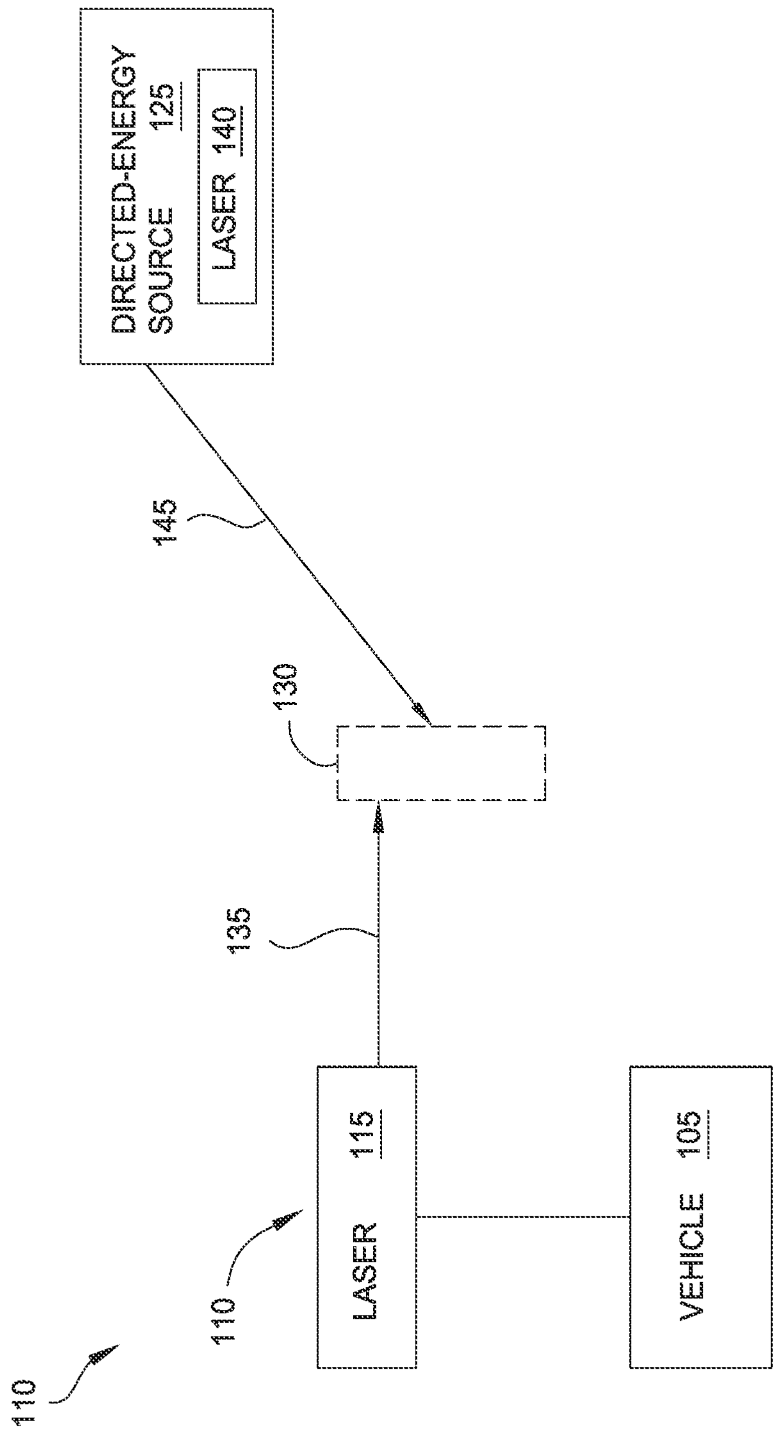
FIG. 1 illustrates a laser defense system for countering a directed-energy source.

FIG. 1 illustrates a laser defense system 110 for countering a directed-energy source 125. In environment 100, the directed-energy source 125 includes a laser source 140 that emits laser energy 145 targeting a vehicle 105. That is, the laser energy 145 (e.g., a laser beam) is the incident radiation emitted by the directed-energy source 125. The laser source 140 may be a chemical oxygen iodine laser (COIL), hydrogen fluoride (HF/DR) laser, amplified yttrium aluminum garnet (YAG) laser, and the like. However, although the present disclosure specifically discusses using the laser source 140 as the directed-energy source 125, the plasma shield described herein may also be used to block any type of directed-energy sources that emits electromagnetic radiation regardless whether this radiation is in the visible spectrum (e.g., blue or red light) or outside the visible spectrum (e.g., infrared light or microwaves).

As shown in FIG. 1, the laser defense system 110 is attached to the vehicle 105. The vehicle 105 may be a wheeled vehicle, tracked vehicle, aircraft, boat, and the like. Although a vehicle 105 is shown, in other aspects, the laser defense system 110 may be mounted on a stationary structure. For example, the laser defense system 110 may be mounted on or near a strategic building to protect personnel or the building from harm.

The laser defense system 110 includes a laser source 115 that emits a laser that generates a plasma shield region 130 outlined by the dotted lines. The energy provided by the laser 115 breaks the atomic bonds of the molecules within the region 130 to generate the plasma. For example, the laser 135 may ionize the molecules in region 130 by removing an electron from an atom or molecule in the gaseous state. These free electrons generate the plasma shield. Although ionizing the atoms in region 130 is sufficient to generate a plasma shield, in other examples, the laser 135 may provide enough energy to disassociate the molecular bonds in region 130. Stated generally, the plasma shield is created by heating the gas in region 130 the laser 135 or subjecting the gas to a strong electromagnetic field applied using the laser 135. In one embodiment, the laser defense system 110 generates the plasma in the atmosphere (e.g., air) surrounding the vehicle 105. However, in other embodiments, the laser defense system 110 may emit gas into the atmosphere that may enhance the plasma in the shield region 130. Put differently, the laser defense system 110 may emit a gas into region 130 that may make it easier for the laser 135 to generate the plasma or generates denser plasma.

Because plasma is opaque to electromagnetic radiation, the laser energy 145 striking region 130 cannot pass through the plasma shield. Furthermore, not only does the plasma shield mitigate or prevent the laser energy 145 from reaching the vehicle 105 (i.e., the target), the laser energy 145 also helps to maintain the plasma shield. As the laser energy 145 is absorbed in the plasma shield region 130, this energy may ionize more of the molecules within the shield region 130 thereby maintaining (or increasing) the density of the plasma within region 130. Thus, a plasma shield may be strengthened when struck by the laser energy 145. As such, even if energy emitted by the directed-energy source 125 is increased, the density of the plasma shield also increases thereby preventing the laser energy 145 from harming the vehicle 105. Put differently, the plasma shield is able to dynamically respond to the energy levels emitted by the directed-energy source 125 to prevent harm to the vehicle 105. In one aspect, the laser 135 emitted by the laser defense system 110 need only start the plasma in region 130. The energy added to the plasma as a result of the laser energy 145 striking the region 130 ensures the opacity of the plasma shield is sufficient to prevent the laser 140 from causing any substantial harm to the vehicle 105.

The distance between the vehicle 105 and the plasma shield may vary depending on the application. One advantage of having the plasma shield region 130 closer to the vehicle 105 is that the region 130 can guard the vehicle 105 from attacks in more directions than a region located further from the vehicle 105. However, if the plasma shield is generated close to the vehicle, the heat from the plasma may harm the vehicle. Moreover, the plasma shield blocks all electromagnetic radiation, whether desired or undesired, from passing therethrough. Thus, having the plasma radiation close to the vehicle 105 may interfere which the ability of a communication system in the vehicle 105 (e.g., a radio) from transmitting radio waves. Thus, these all factors may be considered and balanced when selecting how far away from the vehicle 105 to generate the plasma shield. In one aspect, the laser defense system may use a lens or lenses to control the focal point of the laser source 115 which dictates the location of the plasma shield. In one aspect, the laser defense system 110 may generate the plasma shield anywhere from 5-10 centimeters to several meters from the vehicle 105.

Although only one laser source 115 is shown in FIG. 1, the laser defense system 110 may include any number of lasers. Moreover, these lasers may generate multiple different plasma shield regions 130 around the vehicle 105. These shield regions 130 may be contiguous (i.e., spatially connected) or independent plasma shields. Moreover, multiple lasers may be used to generate the same plasma shield. For example, two or three lasers may work in synchronization to generate the plasma within region 130.

Figure 2:
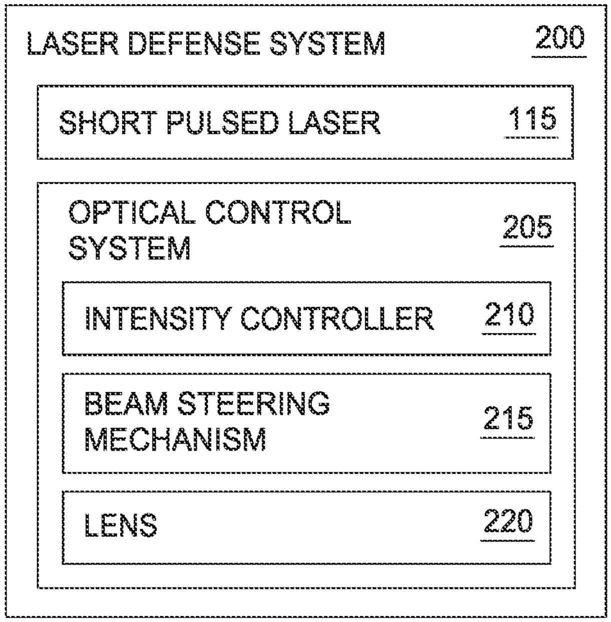
FIG. 2 is a block diagram of a laser defense system for countering a directed-energy source.

FIG. 2 is a block diagram of a laser defense system 200 for countering a directed-energy source. The system 200 includes a short pulsed laser 115 and an optical control system 205. The pulsed laser 115 generates short pulses of laser energy (e.g., 1-100 picosecond pulses) rather than a continuous laser signal. Generating plasma requires a high amount of energy, but this energy only needs to be delivered periodically for a short duration. As such, pulsed lasers 115 are well-suited for generating plasmas in free space since these lasers deliver large amounts of energy in short bursts. However, a continuous laser rather than a short pulses laser may be used so long as the continuous laser can generate sufficient energy to generate plasma in the shield region.

Moreover, to further increase the intensity of laser 115, the optical control system includes a lens 220 for dictating the focal length of the laser 115. As the beam spot decreases, the energy outputted by the laser 115 is focused into a smaller area (e.g., a 10-200 micron beam spot) thereby increasing the energy density. This energy may be sufficient to cause the molecules within the beamspot to ionize thereby generating a plasma. Thus, for each pulse, the laser 115 can generate plasma at the focal spot dictated by the lens 220. Moreover, the focal length of the lens 220 may establish the distance between the plasma shield and the vehicle on which the laser defense system 200 is mounted.

The optical control system 205 also includes an intensity controller 210 and beam steering mechanism 215. The intensity controller 210 may be a power supply coupled to the laser 115 that controls the amount of power outputted by the laser 115. Moreover, the intensity controller 210 may control the length of the pulses used by the laser 115. The beam steering mechanism 215 may be an apparatus that generates an electrical field that deflects the laser signal outputted by the pulsed laser 115. Although mirrors could be used to deflect the laser signal, using mechanical actuators to deflect the laser may take longer thereby reducing how fast the laser source 115 can raster as described below.

Figure 3A:
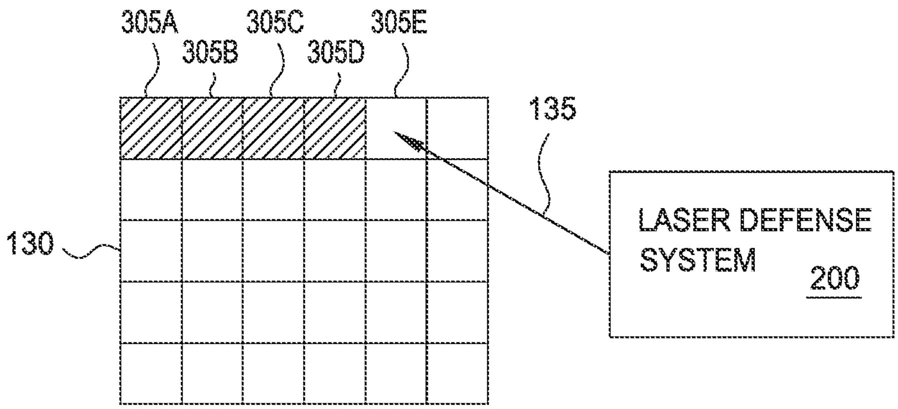
FIGS. 3A and 3B illustrate a 2-D view of a plasma shield generated by a laser defense system.
Figure 3B:
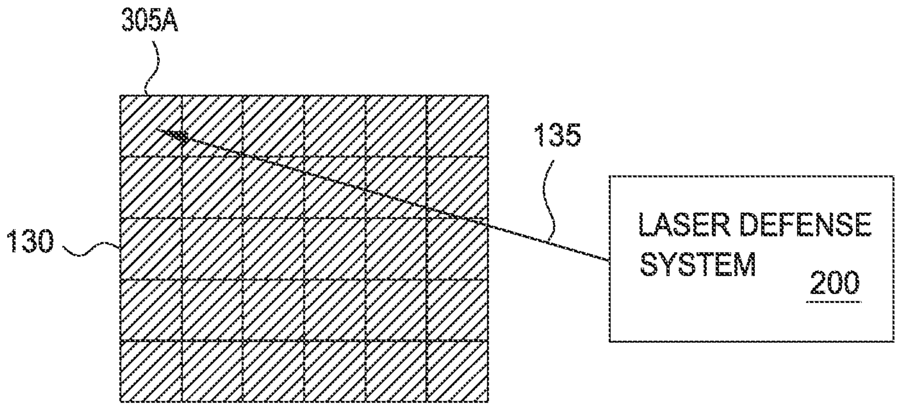

FIGS. 3A and 3B illustrate a 2-D view of a plasma shield generated by a laser defense system. Specifically, FIGS. 3A and 3B illustrate a cross sectional view of the region 130 illustrated in FIG. 1. That is, FIGS. 3A and 3B illustrate the view of the plasma shield as seen by the laser defense system 200 on the vehicle or the directed-energy source. In this example, the beam steering mechanism deflects the laser signal outputted by the pulse laser such that laser signal strikes a different sub-portion 305 during each pulse. Put differently, for each laser pulse, the beam steering mechanism deflects the direction of the laser signal to a different sub-portion 305 within the region 130. Here, the laser defense system 200 first strikes sub-portion 305A and provides enough energy to generate plasma within this portion 305A as represented by the shaded boxes. During the next pulse, the beam steering mechanism directs the laser signal to the next sub-portion 305B to generate the plasma at this location. In FIG. 3A, the laser defense system 200 is currently focusing on sub-portion 305D to generate a plasma at this location.

As shown, sub-portions 305A-D continue to have plasma at these locations even though the laser defense system 200 is no longer injecting energy into these regions. Although it takes only a short pulse to generate the plasma (e.g., 1-100 ps), the plasma may remain in these regions for several microseconds. Thus, sub-portion 305A will continue to contain plasma even after the laser defense system 200 has moved on to generate plasma in different sub-portions 305.

FIG. 3B illustrates a complete plasma shield within region 130. That is, the laser defense system 200 has completed rastering through the region 130 to generate plasma at each of the sub-portions 305. The particular path the system 200 traverses to strike each of the sub-portions 305 with the laser signal does not matter so long as the system 200 can strike each of the sub-portions 305 before the plasma generated in the first sub-portion 305A has disappeared (e.g., the ionized electrons have recombined with an atom or molecule). For example, if the laser can generate 50 pulses every microsecond and it takes two microseconds before the plasma generated in a sub-portion 305 dissipates, the laser defense system 200 can generate a plasma shield that includes 100 sub-portions 305 within region 130.

The size of the region 130 and the sub-portions 305 will vary according to the duration of the pulses, the output energy of the laser, the beam spot or focal length of the laser, and the like. By controlling these factors, the laser defense system 200 can generate a plasma shield with the desired dimensions. In one aspect, the laser defense system 200 dynamically changes the dimensions of the region 120 or the sub-portions 305 depending on the situation. For example, if the laser defense system 200 determines multiple threats, the intensity controller 210 may increase the dimensions of the shield region 130 by increasing the frequency of the pulses (and number of sub-portions 305) to increase the protection by the plasma shield to the vehicle.

Figure 4:
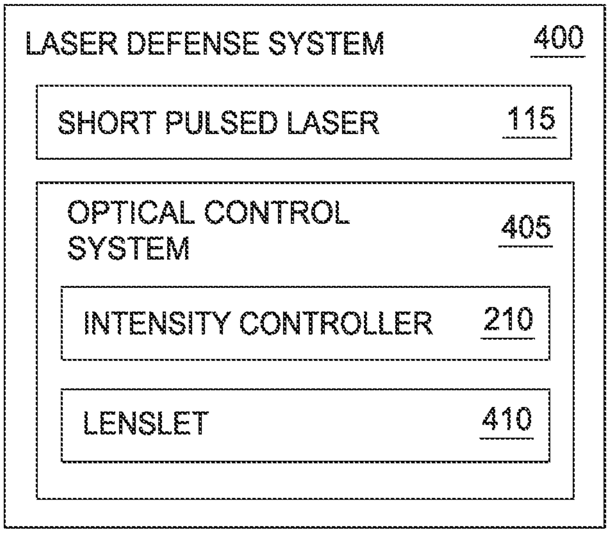
FIG. 4 is a block diagram of a laser defense system for countering a directed-energy source.

FIG. 4 is a block diagram of a laser defense system 400 for countering a directed-energy source. Like in FIG. 2, the laser defense system 400 includes the short pulsed laser 115 and intensity controllers 210 which were described in detail above. The laser defense system 400 also includes an optical control system 405 with a lenslet 410. The lenslet 410 may include a beam splitter to split the laser signal outputted by the laser 115 into multiple separate laser signals. Each of these signals may correspond to one of the lenses in the lenslet 410. Thus, in this manner, the output of a single laser 115 can be split into multiple different laser signals that propagate along different paths simultaneously.

Figure 5:
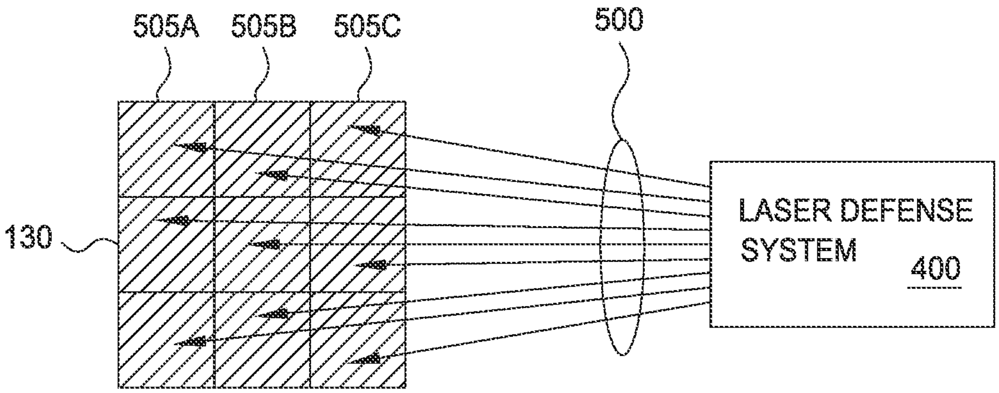
FIG. 5 illustrates a 2-D view of a plasma shield generated by a laser defense system.

FIG. 5 illustrates a 2-D view of a plasma shield generated by the laser defense system 400. Because of the lenslet 410, the laser defense system 400 can output multiple laser signals 500 which strike the plasma shield region 130 simultaneously. Stated differently, the lenslet 410 focuses each of the separate laser signals 500 onto a respective sub-portion 505. For example, the laser signals 500 include different laser signals that simultaneously strike sub-portion 505A, 505B, 505C, etc. In this example, the lenslet includes a respective lens for each of the sub-portions 505 in region 130. Thus, during each pulse of the laser, the laser defense system 400 outputs a respective laser signal 500 through the lenslet for each of the sub-portions 505. In this manner, the laser defense system 400 generates plasma is each of the sub-portions 505 simultaneously. Like above, the laser defense system 400 may use a pulse duration for the laser that ensures that a new set of laser signals 500 are emitted before the plasma in each of the sub-portions 505 recombine, thereby maintaining the plasma shield. Unlike the rastering technique shown in FIGS. 3A and 3B, in FIG. 5, plasma is generated in multiple (or all) of the sub-portions 505 simultaneously. Thus, the laser defense system 400 may be able to generate the complete plasma shield more quickly using the technique illustrated in FIG. 5, as opposed to the technique shown in FIG. 3. However, because the laser signal is split into the plurality of laser signals 500, this technique may use a higher powered laser source than the technique shown in FIGS. 3A and 3B.

Although FIG. 5 illustrates using the lenslet such that each sub-portion 305 within the plasma shield region 130 is struck by the laser signals 500 during each laser burst, this is not a requirement. In another aspect, the laser defense system 400 may include a beam steering module that can divert or steer the laser signals 500. For example, the lenslet may output only three laser signals during each laser pulse. Using the beam steering module, the laser defense system 400 may control the laser signals 500 such that during a first pulse the laser signals 500 strike the upper row of region 130 (i.e., sub-portions 505A, 505B, and 505C), during a second pulse the laser signals 500 strike the middle row of region 130, and during a third pulse the signals 500 strike the bottom row of region 130. Thus, the lenslet may output multiple laser signals 500 which are then rastered through the region 130 to create the plasma shield using multiple laser pulses. So long as the laser signals 500 are rastered with enough frequency to prevent the plasma in any one of the sub-portions 505 from recombining, the laser defense system 400 can maintain a continuous plasma shield in region 130.

Figure 6A:
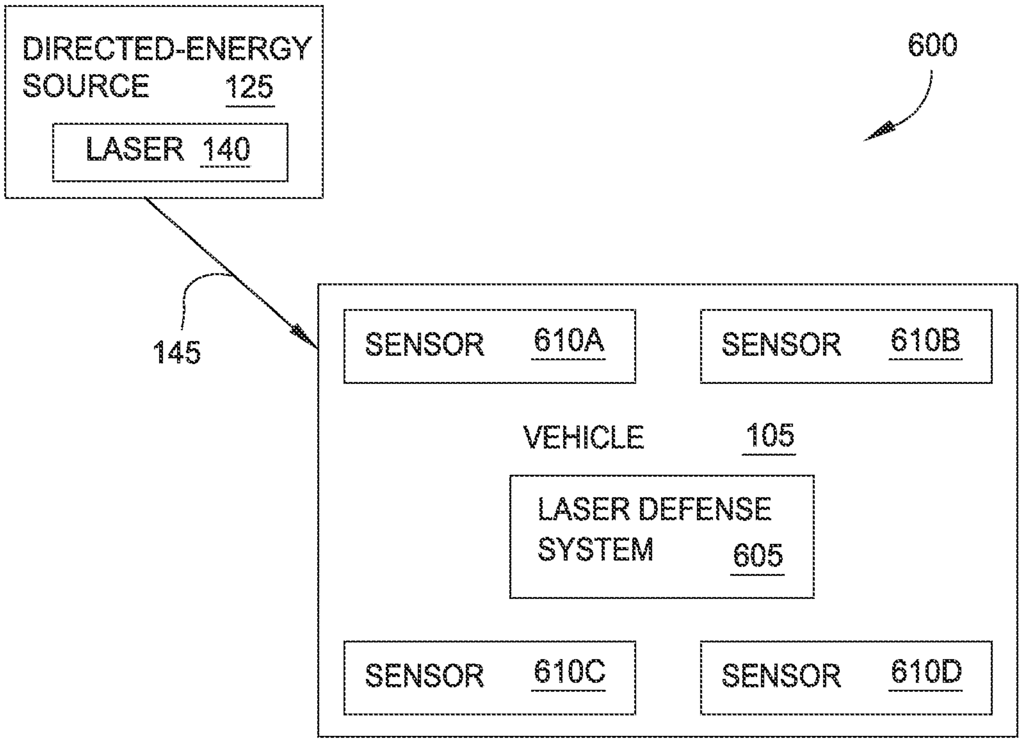
FIGS. 6A and 6B illustrate a laser defense system for detecting and countering a directed-energy source.
Figure 6B:
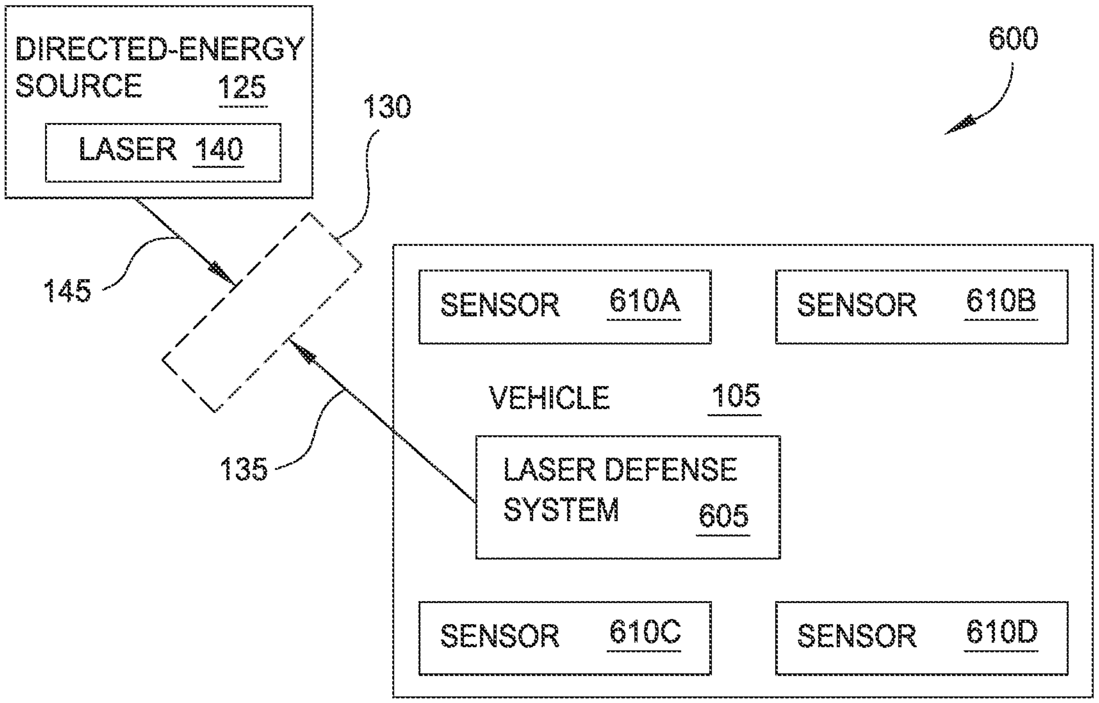

FIGS. 6A and 6B illustrate a laser defense system 605 for detecting and countering a directed-energy source 125. As shown in environment 600, the directed-energy source 125 includes a laser 140 that strikes the vehicle 105. As shown, the vehicle 105 includes multiple sensors 610 that are disposed at different locations in the vehicle 105. The sensor 610 detect electromagnetic radiation emitted by a directed-energy source that strikes a structure—e.g., vehicle 105. In one aspect, the sensors 610 are photosensitive devices (e.g., photodetectors) that can detect a certain wavelength of electromagnetic radiation. In another embodiment, the vehicle 105 includes sensor 610 for detecting other types of electromagnetic radiation such as infrared or microwaves to detect directed-energy sources that emit these types of radiation.

Although not shown, a central computing device in the laser defense system 605 may evaluate measurements captured by the sensors 610 to determine when the directed-energy source 125 is targeting the vehicle. That is, the sensors 610 can detect the wavelengths of the laser 140 emitted by the directed-energy source 125. For example, the directed-energy source 125 may include a laser source (e.g., a COIL, HF/DR, or amplified YAG laser) or a microwave transmitter that emits electromagnetic radiation at a particular wavelength. Thus, if the sensors 610 detect a spike of energy at these known wavelengths, the laser defense system 605 can determine the vehicle 105 is being targeted. In one aspect, the vehicle 105 may include different sensors 610 at each of the locations. For example, the vehicle 605 may include multiple sensors at each of the four locations on vehicle 105 shown in FIG. 6A to detect the wavelengths used by different directed-energy source 125. For example, one of the sensors 610 may detect the wavelength used by COIL laser while another sensor detects the wavelength used by amplified YAG lasers.

In one aspect, the laser defense system 605 may determine the direction or location of the directed-energy source 125 relative to the vehicle 105. For example, depending which sensor 610 detects the laser energy 145 may indicate to the laser defense system 605 which direction the directed-energy source 125 is located.

FIG. 6B illustrates using the laser defense system 605 to generate the plasma shield region 130 for blocking the laser 140. After identifying the location of the directed-energy source 125, the laser defense system 605 generates, in response to detecting the electromagnetic radiation, plasma in a plasma shield region 130 disposed between the directed-energy source 125 and the structure—i.e., vehicle 105. The laser defense system 605 activates a short pulsed laser to generate plasma within the region 130 which is between the directed-energy source 125 and the vehicle 105. As discussed above, this region 130 is opaque to the laser 140 which prevents the laser energy 145 from harming the vehicle 105. Moreover, the energy in the laser 145 can be used to maintain the plasma within region 130. That is, as the laser emitted by the directed-energy source 125 strikes the plasma shield 130, the laser energy is absorbed by the plasma and may maintain or increase the density of the plasma within region 130.

The laser defense system 605 generates the plasma in region 130 before the laser 140 can damage the vehicle 105. That is, the laser defense system 605 can determine that the laser energy 145 is striking the vehicle 105 and generate the plasma shield region 130 before the laser 140 can cause substantial harm to the vehicle 105. Because the directed-energy source 125 relies on heat to damage the vehicle 105, the laser energy 145 typically must strike the same location of the vehicle for several seconds before substantial harm is done. However, the laser defense system 605 can react quickly (i.e., within microseconds or less than a second) to the presence of the laser 140 and generate the plasma shield before the laser energy 145 can cause substantial damage such as penetrating an outer wall of the vehicle 105 or damaging components disposed on the outside of the vehicle 105.

In one aspect, it is not necessary that the laser defense system 605 identify the location of the directed-energy source 125. Put differently, the laser defense system 605 does not need to know exactly where the directed-energy source 125 is in order to defend the vehicle 105 from harm. For example, the vehicle may have only certain areas that are susceptible to harm from the directed-energy source 125. In one example, much of the vehicle may be covered with a shielding (e.g., a thick metal outer shell) that may be impenetrable to the laser 140. However, other regions of the vehicle 105 (e.g., an exposed communication antenna or passenger compartment) may be vulnerable to harm by the directed-energy source 125. When any of the sensors 610 detect a laser 140 is targeting the vehicle, the laser defense system 605 activates a plasma shield region 130 that surrounds the susceptible or vulnerable portions of the vehicle 105 and prevents harm to these locations. Put differently, the laser defense system 605 may activate plasma shield regions 130 around the susceptible portions to protect these portions regardless of the direction of the directed-energy source 125 relative to vehicle. As such, in this example, the laser defense system 605 does not need to identify the location of the directed-energy source 125.

To determine when to deactivate the plasma shield, after a pre-defined period of time (e.g., after three to ten seconds) the laser defense system 605 may stop outputting the laser 135. If the directed-energy source 125 is still targeting the vehicle 105, the energy from the laser 145 maintains the plasma in the portion of the region 130 still being struck by the laser 140. If, however, the directed-energy source 125 has ceased targeting the vehicle 105, all the plasma in the region 130 will eventually disappear. Thus, the laser defense system 605 can stop generating the plasma shield after a predefined period of time in order to save energy. Once the sensors 610 sense another spike in electromagnetic radiation corresponding to the directed-energy source 125, the laser defense system 605 again activates the plasma shield region 130.

The aspects described herein can be used to prevent or mitigate the harm caused by a directed-energy source on a targeted structure. A laser defense system can be mounted on or near the structure and may include a number of sensors for identifying a directed-energy attack. If an attack is detected, the laser defense system activates a plasma shield region between the directed-energy source and the targeted structure. Because plasma is "dark" or opaque to electromagnetic radiation, the radiation emitted by the directed-energy source is absorbed by the plasma rather than striking the vehicle.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor comprising hardware and software to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices comprising hardware and software from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:

1. A laser defense system, comprising:
- at least one sensor configured to detect a weaponized laser emitted by a directed-laser source;
- a laser source; and
- an optical control system configured to:
  - determine a distance to generate a plasma from a surface of a targeted structure based on (i) heat generated by the plasma harming the targeted structure and (ii) the plasma blocking radio waves transmitted by a radio on the targeted structure,
  - in response to detecting the weaponized laser emitted by the directed-laser source, direct, based on the distance, a laser signal emitted by the laser source to generate the plasma in a defined plasma shield region to prevent the weaponized laser from reaching the targeted structure,
  - stop outputting the laser signal after a period of time to determine whether the weaponized laser has ceased targeting the targeted structure.

2. The laser defense system of claim 1, further comprising a plurality of sensors that includes the at least one sensor, wherein the plurality of sensors are disposed at different locations on a structure targeted by the directed-laser source.

3. The laser defense system of claim 1, wherein the laser source does not emit the laser signal until the weaponized laser is detected using the at least one sensor.

4. The laser defense system of claim 1, wherein the laser source emits the laser signal before the weaponized laser is detected using the at least one sensor.

5. The laser defense system of claim 1, wherein the optical control system is configured to establish the plasma shield region based on a location of the directed-laser source such that the plasma shield region is between the directed-laser source and a structure targeted by the directed-laser source.

6. The laser defense system of claim 1, wherein the laser source is a pulsed laser source and the plasma shield region is divided into a plurality of sub-portions, wherein the optical control system is configured to generate plasma in only one of the sub-portions during each pulse of the laser source.

7. The laser defense system of claim 1, wherein the laser source is a pulsed laser source and the plasma shield region is divided into a plurality of sub-portions, wherein the optical control system is configured to generate plasma in multiple sub-portions of the plurality of sub-portions during each pulse of the laser source.

8. The laser defense system of claim 1, wherein the optical control system is configured to:
- identify a location of the directed-laser source relative to the laser defense system
- determine a location of the plasma shield region based on the location of the directed-laser source; and
- establish the plasma shield region such that the plasma shield region is disposed between the directed-laser source and the laser defense system.

9. The laser defense system of claim 1, wherein the optical control system is configured to establish the plasma shield region based on a detected path traversed by the weaponized laser emitted by the directed-laser source to the targeted structure, wherein the weaponized laser causes physical damage to the targeted structure if the weaponized laser is permitted to reach the targeted structure.

10. A method, comprising:
- detecting, using a sensor, a weaponized laser emitted by a directed-laser source that strikes a structure; and
- determining a distance to generate a plasma from a surface of the structure based on (i) heat generated by the plasma harming the structure and (ii) the plasma blocking radio waves transmitted by a radio on the structure;
- generating, in response to detecting the weaponized laser, the plasma based on the distance in a plasma shield region disposed between the directed-laser source and the structure to prevent the weaponized laser from reaching the structure; and stop outputting the laser signal after a period of time to determine whether the weaponized laser has ceased targeting the structure.

11. The method of claim 10, further comprising:

identifying a location of the directed-laser source relative to the structure; and determining a location of the plasma shield region based on the location of the directed-laser source so that the plasma shield region is disposed between the directed-laser source and the structure.

12. The method of claim 10, wherein generating the plasma in the plasma shield region further comprises:

rastering a laser source generating the plasma in a predefined pattern to generate the plasma shield region, wherein the predefined pattern divides the plasma shield region into a plurality of sub-portions.

13. The method of claim 12, wherein generating the plasma in the plasma shield region further comprises:

repeating the predefined pattern using a pulsed laser source before the plasma in any one of the sub-portions completely disappears.

14. The method of claim 10, wherein generating the plasma in the plasma shield region further comprises:

splitting a laser signal into a plurality of separate laser signals; and focusing each of the separate laser signals onto respective sub-portions of the plasma shield region, wherein the separate laser signals generate plasma in the respective sub-portions simultaneously.

15. The method of claim 14, wherein splitting the laser signal is performed using a lenslet disposed between a laser source emitting the laser signal and the plasma shield region.

16. A laser defense system, comprising:

at least one sensor configured to detect a weaponized laser emitted by a directed-laser weapon;

a laser source; and an optical control system configured to:

determine a direction of the directed-laser weapon relative to the laser defense system, determine a distance to generate a plasma from a surface of a structure based on (i) heat generated by the plasma harming the structure and (ii) the plasma blocking radio waves transmitted by a radio on the structure, direct, based on the determined direction to the directed-laser weapon and the distance, a laser signal emitted by the laser source to generate a plasma in a defined plasma shield region such that the plasma blocks the weaponized laser from striking the structure, and stop outputting the laser signal after a period of time to determine whether the weaponized laser has ceased targeting the structure.

17. The laser defense system of claim 16, wherein the laser source does not emit the laser signal until the weaponized laser is detected using the at least one sensor.

18. The laser defense system of claim 16, wherein the laser source emits the laser signal before the weaponized laser is detected using the at least one sensor.

19. The laser defense system of claim 16, wherein the laser source is a pulsed laser source and the plasma shield region is divided into a plurality of sub-portions, wherein the optical control system is configured to generate plasma in only one of the sub-portions during each pulse of the laser source.

20. The laser defense system of claim 16, wherein the laser source is a pulsed laser source and the plasma shield region is divided into a plurality of sub-portions, wherein the optical control system is configured to generate plasma in multiple sub-portions of the plurality of sub-portions during each pulse of the laser source.

* * * * *